United States Patent
Lee et al.

(10) Patent No.: US 9,508,998 B2
(45) Date of Patent: Nov. 29, 2016

(54) APPARATUS AND METHOD FOR ACTIVATING FUEL CELL STACK

(75) Inventors: Jae Hyuk Lee, Gyeonggi-do (KR); Hwan Soo Shin, Gyeonggi-do (KR); Sung Keun Lee, Gyeonggi-do (KR); Hyun Suk Choo, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 968 days.

(21) Appl. No.: 13/297,693

(22) Filed: Nov. 16, 2011

(65) Prior Publication Data

US 2013/0022883 A1    Jan. 24, 2013

(30) Foreign Application Priority Data

Jul. 18, 2011  (KR) .................. 10-2011-0071201

(51) Int. Cl.
    *H01M 8/04*       (2016.01)
    *H01M 8/04828*    (2016.01)
    *H01M 8/04746*    (2016.01)

(52) U.S. Cl.
    CPC ..... *H01M 8/04126* (2013.01); *H01M 8/04753* (2013.01); *H01M 8/04835* (2013.01); *H01M 8/04895* (2013.01); *Y02E 60/50* (2013.01)

(58) Field of Classification Search
    CPC ................... H01M 8/04126; H01M 4/04753; H01M 4/04835; H01M 4/04895; H01M 8/04223
    See application file for complete search history.

(56) References Cited

U.S. PATENT DOCUMENTS

| | | |
|---|---|---|
| 6,096,448 A | 8/2000 | Wilkinson et al. |
| 6,576,357 B1 | 6/2003 | Helmolt |
| 2005/0095472 A1* | 5/2005 | Schrooten et al. ............. 429/17 |
| 2005/0202309 A1* | 9/2005 | Nakagawa et al. ............. 429/49 |
| 2007/0134522 A1 | 6/2007 | Ko et al. |
| 2009/0117418 A1* | 5/2009 | Obata et al. .................... 429/13 |

FOREIGN PATENT DOCUMENTS

| | | | |
|---|---|---|---|
| CN | 1516906 A | | 7/2004 |
| CN | 1979932 A | | 6/2007 |
| CN | 101624020 A | | 1/2010 |
| JP | 60-097555 B2 | | 5/1985 |
| JP | 2005158734 A | | 6/2005 |
| JP | 2009-277637 A | | 11/2009 |
| JP | 2010061918 A | | 3/2010 |
| KR | 10-2007-0060760 | * | 6/2007 |
| KR | 10-2009-0061833 | | 6/2009 |
| KR | 10-2011-0029688 | | 3/2011 |
| WO | 03/058743 A2 | | 7/2003 |

OTHER PUBLICATIONS

English translation of KR 10-2007-0060760 (published Jun. 2007).*

* cited by examiner

*Primary Examiner* — Eugenia Wang
(74) *Attorney, Agent, or Firm* — Mintz Levin Cohn Ferris Glovsky and Popeo, P.C.; Peter F. Corless

(57) ABSTRACT

Disclosed is an apparatus and method for activating a fuel cell stack, which significantly reduces the time required for activation and the amount of hydrogen used for the activation by employing a vacuum wetting process in a shutdown operation. In particular, a high humidity open circuit voltage operation humidifies the fuel cell stack and operates the fuel cell stack at an open circuit voltage, and a vacuum wetting operation wets the surface of a polymer electrolyte membrane by creating a vacuum atmosphere in the fuel cell stack. The high humidity open circuit voltage operation and the vacuum wetting operation are performed alternately and repeatedly.

6 Claims, 5 Drawing Sheets

APPARATUS AND METHOD FOR ACTIVATING FUEL CELL STACK

CROSS-REFERENCE TO RELATED APPLICATION

This application claims under 35 U.S.C. §119(a) the benefit of Korean Patent Application No. 10-2011-0071201 filed Jul. 18, 2011, the entire contents of which are incorporated herein by reference.

BACKGROUND (a) Technical Field

The present invention relates to activation of a fuel cell stack. More particularly, it relates to an apparatus and method for activating a fuel cell stack, which significantly reduces the time required for activation and the amount of hydrogen used for the activation by employing a vacuum wetting process in a shutdown therein.

(b) Background Art

There has been an increasing request worldwide for the development of environmentally-friendly vehicles due to growing public concerns and interests on environmental issues and $CO_2$ regulation. Therefore, environmentally-friendly and high efficiency fuel cell vehicles, which can replace internal combustion engine vehicles which cause environmental pollution, have attracted a lot of public attention.

In particular, in a fuel cell vehicle, after assembly of a fuel cell stack which is a core component of the fuel cell vehicle, a stack activation process is performed to (1) ensure a three-phase electrode reaction zone is present, (2) remove impurities from a polymer electrolyte membrane or electrodes, and (3) improve the ionic conductivity of the polymer electrolyte membrane. By ensuring these three qualities, the fuel cell stack is able to exhibit normal performance characteristics.

In particular, during initial operation of the fuel cell stack, its activity is reduced in an electrochemical reaction, and thus it is necessary to perform a stack activation process in order to maximize the normal initial performance. This stack activation process is also called pre-conditioning or brake-in, and its purpose is to activate a catalyst which cannot participate in the reaction and to ensure a hydrogen ion passage by sufficiently hydrating electrolytes contained in the electrolyte membrane and electrodes.

FIG. 1 shows an example of a conventional stack activation method/process using a pulse process which includes a high current density discharge and a shutdown discharge. As shown in FIG. 1, the conventional stack activation method is configured to perform a pulse process which utilizes a high current density discharge and a pulse discharge in a shutdown state, repeatedly, several to dozens of times. However, this conventional stack activation method requires a processing time of about 1.5 to 2 hours with respect to a 220-cell sub-module, for example.

In more detail, according to the conventional stack activation method, a high current density (1.2 or 1.4 $A/cm^2$) is discharged for 3 minutes and a pulse discharge process performed during a shutdown state for 5 minutes. These two processes are repeatedly performed about 11 times in all before the activation process is complete.

However, the amount of hydrogen used in the activation process through the pulse discharge increases as the processing time increases. That is, the conventional activation method, in which the pulse discharge is used in a shutdown state, can vary the flow of water in the fuel cell stack, thereby increasing the activation rate. However, the time required for the activation is about 105 minutes and the amount of hydrogen required for the activation is about 2.9 kg with respect to a 200-cell sub-module, for example. As a result, the method requires a long processing time and a large amount of hydrogen to be effective.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides an apparatus and method for activating a fuel cell stack via a vacuum wetting process, which can effectively improve the ionic conductivity, compared to an existing activation process, thereby significantly reducing the amount of hydrogen used for activation and the time required for the activation to be completed.

In one aspect, the present invention provides a system and method for activating a fuel cell stack. In particular, this system and method includes a high humidity open circuit voltage operation which humidifies the fuel cell stack and operates the fuel cell stack at an open circuit voltage; and a vacuum wetting operation which wets the surface of a polymer electrolyte membrane by creating a vacuum atmosphere in the fuel cell stack. More specifically, the high humidity open circuit voltage operation and the vacuum wetting operation are performed alternately and repeatedly for a predetermined period of time or for a predetermined number of repetitions.

In an exemplary embodiment, the vacuum wetting operation may also cut off the supply of hydrogen and air and apply a current to consume residual gas in the fuel cell stack, thereby creating a vacuum atmosphere in the fuel cell stack. Additionally, the high humidity open circuit voltage operation and the vacuum wetting operation may be performed repeatedly at regular intervals, which may be, for example, for a predetermined time of 2 to 5 minutes for the high humidity open circuit voltage operation and 2 to 5 minutes for the vacuum wetting operation. Furthermore, in some embodiments, in the high humidity open circuit voltage operation may perform the humidification process at a relative humidity of 100% or higher.

In further embodiments, the method may further comprise a hermetic storage operation performed after the high humidity open circuit voltage operation and the vacuum wetting operation are performed repeatedly.

In another aspect, the present invention provides an apparatus for activation a fuel cell stack, the apparatus comprising: an activation body including a hydrogen supply device for supplying hydrogen to the fuel cell stack, an air supply device for supplying air to the fuel cell stack, a humidifier for humidifying the fuel cell stack; and a controller for controlling the activation body, wherein the controller controls the activation body to alternately and repeatedly perform a high humidity open circuit voltage operation and a vacuum wetting operation.

In an exemplary embodiment, the activation body may include a test manifold connected to the fuel cell stack so that hydrogen and air flow into the fuel cell stack. In particular, the test manifold may be connected to a stack docking unit for mounting the fuel cell stack to the activation body. Furthermore, in some embodiments the apparatus may also include a stack transporting unit for transporting the fuel cell stack to be activated.

Other aspects and embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
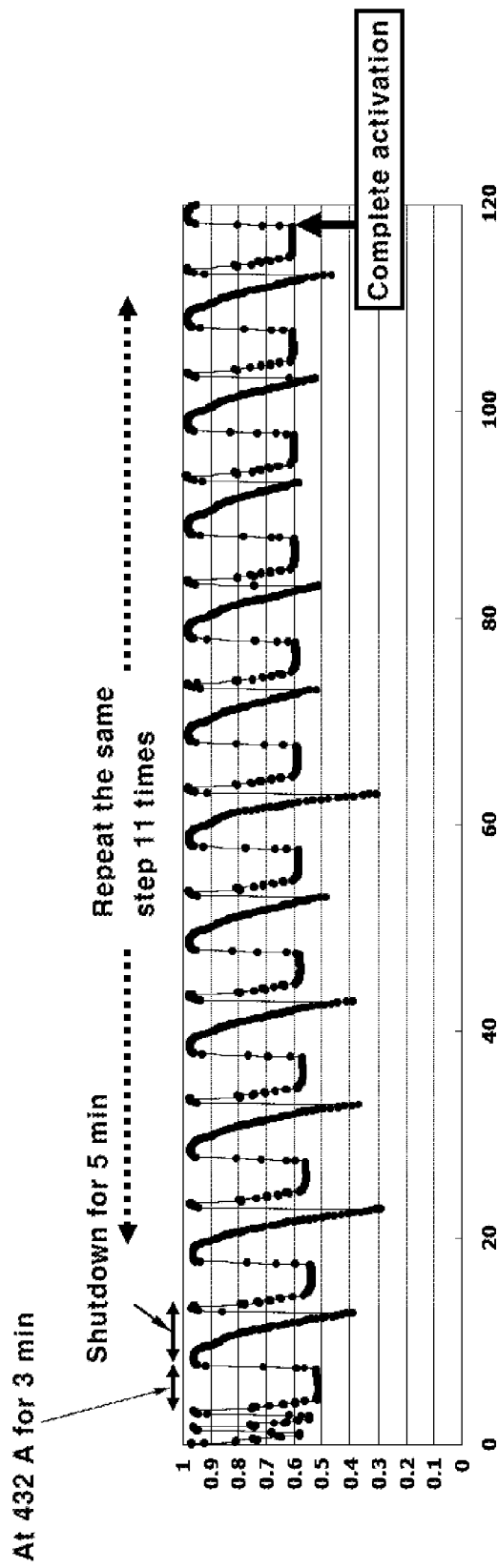
FIG. 1 is a process diagram illustrating a conventional method for activating a fuel cell stack.

Reference numerals set forth in the Drawings includes reference to the following to elements as further discussed below:

100: activation body
110: test manifold
200: stack docking unit
300: stack transporting unit
400: fuel cell stack It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The present invention provides an apparatus, a system and a method for activating a fuel cell stack, which achieves activation of a fuel cell stack with an extremely small amount of hydrogen within a short time by repeatedly performing a humidification operation which introduces liquid droplets into the fuel cell stack and a vacuum wetting operation which creates a vacuum atmosphere by consuming residual gas in the fuel cell stack.

Below, an apparatus for activating a fuel cell stack in accordance with an illustrative embodiment of the present invention will be described in detail with respect to the accompanying drawings.

Figure 5:
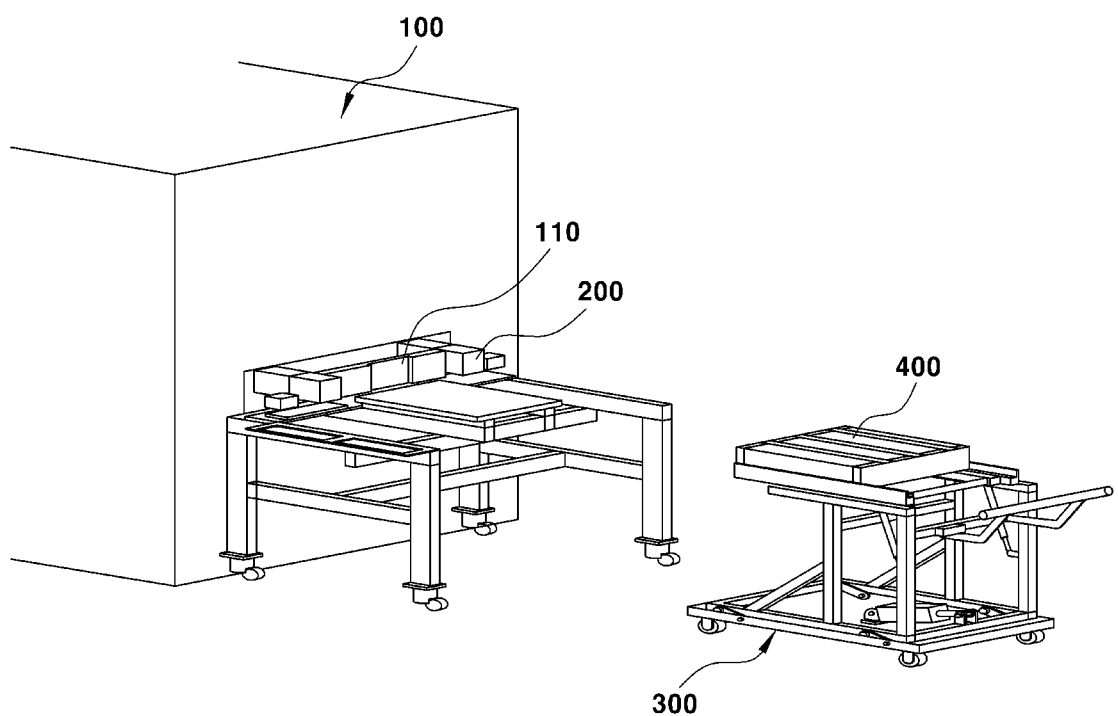
FIG. 5 is a schematic diagram showing the configuration of an apparatus for activating a fuel cell stack in accordance with another embodiment of the present invention.

FIG. 5 is a schematic diagram showing the configuration of an apparatus for activating a fuel cell stack in accordance with an illustrative exemplary embodiment of the present invention. The apparatus of the present invention activates a fuel cell stack manufactured by automatic assembly equipment and includes an activation body 100 for performing the activation within, a stack transporting unit 300 for transporting the manufactured fuel cell stack 400, and a stack docking unit 200 for mounting the fuel cell stack 400 transported by the stack transporting unit 300 to the activation body 100. The stack docking unit 200 is electrically connected to the activation body 100 so that the fuel cell stack 400 can operate and is connected to a test manifold 110 provided in the activation body 100 so that hydrogen and air in the activation body 100 can flow into the fuel cell stack 400 accordingly.

Moreover, the activation body 100 is configured to provide constant conditions for the activation of the fuel cell stack, in which a high humidity open circuit voltage operation and a vacuum wetting operation, which will be described later, are performed alternately and repeatedly. To this end, the activation body 100 may include a hydrogen supply device, an air supply device, a humidifier, and a controller for controlling such devices.

Suitably, the activation body 100 included in the apparatus for activating the fuel cell stack in accordance with the embodiment of the present invention may include a configured system for creating a vacuum atmosphere in the fuel cell stack. In an embodiment of the present invention, the activation body 100 may include a flow cutoff means for cutting off the supply of hydrogen, air, and liquid droplets introduced into the fuel cell stack, thereby creating vacuum. Thus, in the apparatus for activating the fuel cell stack in accordance with the illustrative embodiment of the present invention, while the supply of hydrogen, air, etc. introduced into the fuel cell stack is cut off by the flow cutoff means, a predetermined load is applied to the fuel cell stack such that the residual gas in the fuel cell stack is consumed, thereby creating vacuum in the fuel cell stack.

As mentioned above, the controller included in the activation body 100 of the present invention controls the activation body 100 to alternately and repeatedly perform the high humidity open circuit voltage operation and the vacuum wetting operation. To this end, during the high humidity open circuit voltage operation, the controller controls the activation body 100 to perform the open circuit voltage operation while the hydrogen supply device, the air supply device, and the humidifier are operated. Inversely, during the vacuum wetting operation, the supply of hydrogen, air, etc. introduced into the fuel cell stack is cut off by the flow cutoff means, and a load is applied to the fuel cell stack, thereby achieving the vacuum wetting of the fuel cell stack. These operations are performed repeatedly a predetermined number of times by the controller until activation is complete.

A method for activating a fuel cell stack using the above-described apparatus in accordance with the embodiment of the present invention will be described in detail below.

The method for activating the fuel cell stack in accordance with the embodiment of the present invention eliminates the high current density operation, which is essentially used to for the activation of the conventional fuel cell stack, from the process and improves the ionic conductivity of a polymer electrolyte membrane by using vacuum in a non-output state. Therefore, according to the method for activating the fuel cell stack of the present invention, the activation of the fuel cell stack is completed within a shorter time period than the prior art methods while at the same time using little or no hydrogen.

In detail, the method for activating the fuel cell stack according to the present invention comprises a high humidity open circuit voltage operation and a vacuum wetting operation. As these two operations are repeated, the activation of the fuel cell stack is achieved.

The high humidity open circuit voltage operation is performed to achieve the activation by introducing liquid droplets into the fuel cell stack, and the vacuum wetting operation is performed after the high humidity open circuit voltage operation to improve the ionic conductivity of the polymer electrolyte membrane by wetting the fuel cell stack under a vacuum atmosphere.

The above-described method for activating the fuel cell stack according to the present invention is basically performed in a non-output state, as opposed to the conventional activation method including the high current output operation which is performed in an output state. That is, the method for activating the fuel cell stack according to the present invention is characterized by eliminating the high current output operation.

Meanwhile, when only the vacuum is used without the high current output operation, the method for activating the fuel cell stack according to the present invention does not reach 100% activation but instead exhibits only about 90% activation, compared to the conventional activation method using the high current output operation. In order to solve this problem, after a partial activation process, in which the high humidity open circuit voltage operation and the vacuum wetting operation are repeated, is performed, an additional activation process, known as a hermetic storage operation is further performed to achieve a desired level of activation of the fuel cell stack.

Therefore, in the method for activating the fuel cell stack according to the present invention, the partial activation process, in which the high humidity open circuit voltage operation and the vacuum wetting operation are repeated, and then a hermetic storage operation may be continuously performed to complete the activation of the fuel cell stack.

Figure 2:
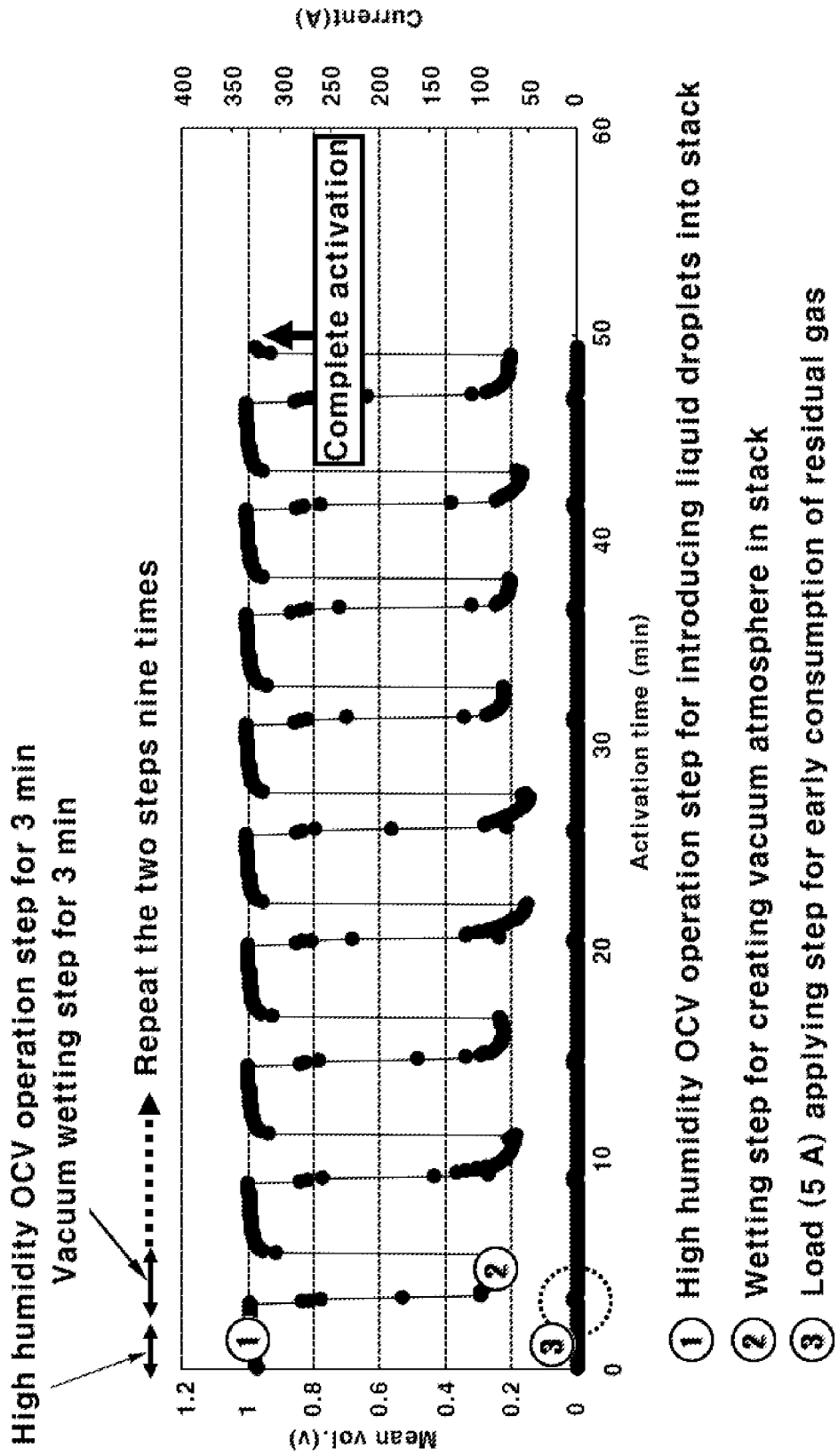
FIG. 2 is a process diagram illustrating a method for activating a fuel cell stack in accordance with an exemplary embodiment of the present invention.

FIG. 2 shows an embodiment of the method for activating the fuel cell stack according to the present invention, which includes the high humidity open circuit voltage operation and the vacuum wetting operation.

In the illustrative embodiment of the method for activating the fuel cell stack according to the present invention shown in FIG. 2, the above-described high humidity open circuit voltage operation and vacuum wetting operation are performed repeatedly at regular intervals to achieve the activation of the fuel cell stack.

Suitably, in the method for activating the fuel cell stack in accordance with the illustrative embodiment of the present invention, the regular intervals at which each operation is performed repeatedly may be determined based on the time at which each operation is performed. In this regard, the high humidity open circuit voltage operation and the vacuum wetting operation may be performed repeatedly for a predetermined time of 2 to 5 minutes, respectively.

The process of the embodiment shown in FIG. 2, in which each operation is performed, will be described in more detail below. First, as shown in FIG. 2, in the present embodiment, the high humidity open circuit voltage operation for introducing liquid droplets into the fuel cell stack is performed for the first 3 minutes. The high humidity open circuit voltage operation is performed in order to ensure sufficient humidification is achieved at a higher relative humidity than that of the prior art. Sufficient humidification preferably corresponds to the conditions under which the fuel cell stack is operated, at a relative humidity of 100% or higher. For example, in the exemplary embodiment of FIG. 2, a high humidity operation is performed under such conditions that the temperature of the humidifier is set at 75° C. and the temperature of coolant is set at 30° C., which correspond to a relative humidity of about 800%. Accordingly, during the high humidity open circuit voltage operation according to the present invention, hydrogen and air are supplied to the fuel cell stack at an open circuit voltage, thereby operating the fuel cell stack.

Next, after the high humidity open circuit voltage operation, the vacuum wetting operation is performed under a vacuum atmosphere for 3 minutes, thereby wetting the fuel cell stack. This operation is performed after the above-described high humidity open circuit voltage operation by cutting off the supply of hydrogen and air and consuming the residual gas in the fuel cell stack to create a vacuum atmosphere.

To this end, during the vacuum wetting operation of the method for activating the fuel cell stack according to the present invention, the supply of hydrogen and air introduced into the fuel cell stack is cut off, and a predetermined load is applied to the fuel cell stack such that the residual gas in the fuel cell stack is consumed. Through the vacuum wetting operation, a vacuum atmosphere is created in the fuel cell stack, thereby wetting the fuel cell stack.

Accordingly, as shown in FIG. 2, during the vacuum wetting operation of the present invention, a current of 5 A, for example, is applied to the fuel cell stack so that the reactant gas remaining in the fuel cell stack is quickly consumed, thereby creating a vacuum atmosphere in the fuel cell stack in a shortened period of time.

Through the above-described vacuum wetting operation, the polymer electrolyte membrane easily swells, and this swelling of the polymer electrolyte membrane changes the surface structure of the membrane such that the uptake of water in pores of the membrane is advantageously made. Suitably, the swelling of the polymer electrolyte membrane changes the structure of polymer $SO_3^-$ suitable for water movement to be easily oriented on the surface of the membrane. Therefore, the water uptake ability of the polymer electrolyte membrane is improved, which in turn improves the ionic conductivity of the polymer electrolyte membrane. That is, the liquid droplets are dispersed into nanopores of the polymer electrolyte membrane, and thus the polymer electrolyte membrane swells. At the same time, the functional groups ($SO_3^-H^+$) increase, which improves the water uptake ability of the polymer electrolyte membrane, thereby improving the ionic conductivity (S/cm) of the polymer electrolyte membrane.

As such, while the flow of water in the polymer electrolyte membrane is limited in the existing stack activation process, when the vacuum wetting operation is performed in the above manner, the water is freely dispersed in the pores of the polymer electrolyte membrane in all directions, which facilitates the migration of hydrogen ions (protons), thereby accelerating the activation of the electrolyte membrane. As a result, the system and method for activating the fuel cell stack according to the present invention achieves the activation within a shorter time period compared to the prior art.

In the embodiment of FIG. 2, the high humidity open circuit voltage operation step for 3 minutes and the vacuum wetting operation for 3 minutes are repeated nine times to achieve the activation of the fuel cell stack. Furthermore, in the method for activating the fuel cell stack according to the present invention, after the high humidity open circuit voltage operation and the vacuum wetting operation are performed repeatedly to activate the fuel cell stack, an additional activation process for further activating the fuel cell stack may be performed.

In detail, after the activation process in which the two operations is repeated, a hermetic storage operation of sealing the fuel cell stack and storing the sealed fuel cell stack for a long period of time is performed to further activate the fuel cell stack.

Figure 3:
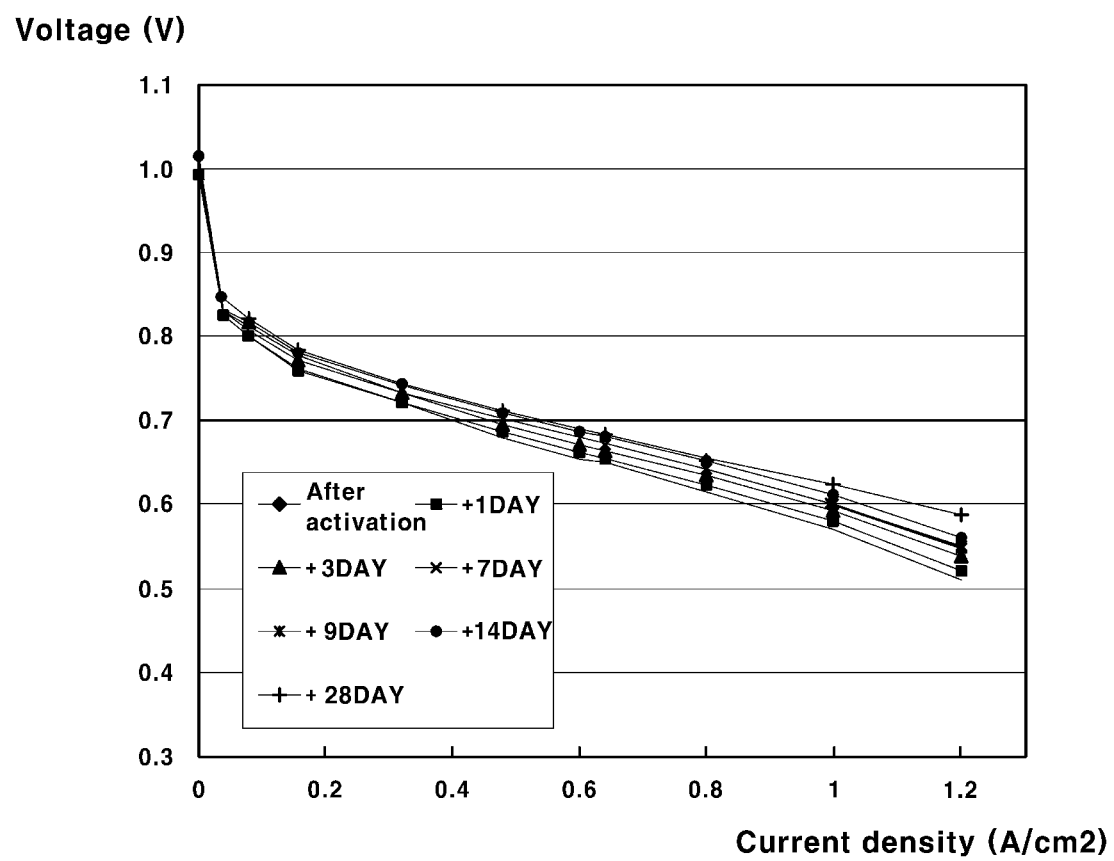
FIG. 3 is a graph showing that the activity is improved by a hermetic storage in the method for activation a fuel cell stack in accordance with an exemplary embodiment of the present invention, in which the relationship between current density and voltage according to the lapse of hermetic storage time is shown.
Figure 4:
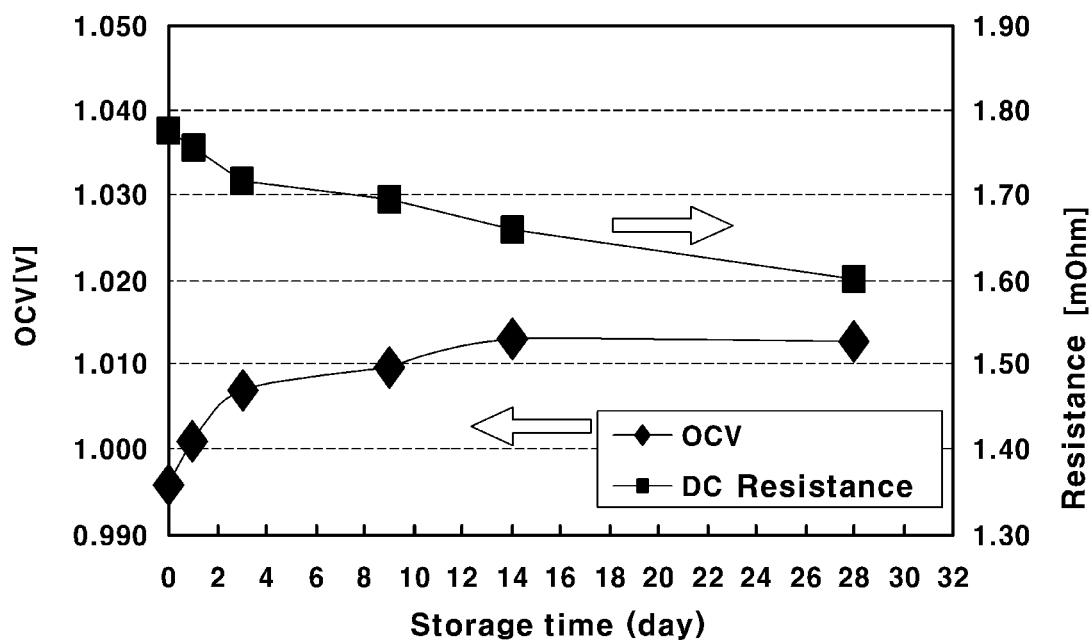
FIG. 4 is a graph showing that the activity is improved by a hermetic storage in the method for activation a fuel cell stack in accordance with an exemplary embodiment of the present invention, in which the change in open circuit voltage and resistance according to the lapse of hermetic storage time is shown.

FIGS. 3 and 4 show the change in performance through the hermetical storage operation. FIG. 3 shows the relationship between current density and voltage according to the lapse of hermetic storage time. As shown in FIG. 3, it can be seen that the voltage of the fuel cell stack with respect to the current density increases through the additional activation of the fuel cell stack according to the lapse of hermetic storage time after the activation. Moreover, FIG. 4 shows the change in open circuit voltage and resistance according to the lapse of hermetic storage time is shown. As shown in FIG. 4, it can be seen that the open circuit voltage increases according to the lapse of hermetic storage time and the resistance decreases, from which it can be seen that the activity is improved according to the lapse of hermetic storage time.

During the additional activation process in the hermetic storage operation, a vacuum atmosphere is increased by the reaction between hydrogen and oxygen such that water is easily dispersed into submicropores of the electrolyte membrane. As a result, the structure of polymer $SO_3^-$ suitable for water movement is oriented to facilitate the migration of hydrogen ions, thereby achieving the activation. Therefore, in the method for activating the fuel cell stack according to the present invention, the high humidity open circuit voltage operation and the vacuum wetting operation are performed repeatedly, and thus it is possible to significantly reduce the time required for the activation of the fuel cell stack and the amount of hydrogen used for the activation. Moreover, according to the method for activating the fuel cell stack of the present invention, the hermetic storage is further performed for further activation, and thus it is possible to further improve the activity of the fuel cell stack after the partial activation process including the above-described high humidity open circuit voltage operation and vacuum wetting operation.

Advantageously, the apparatus and method for activating the fuel cells tack eliminates the process for applying a high output current to the fuel cell stack from the overall process and instead employs the high humidity open circuit voltage operation and the vacuum wetting operation and significantly reduces the number of repeated processes, thereby significantly reducing the time required for the activation of the fuel cell stack and the amount of hydrogen used for the activation.

The invention has been described in detail with reference to embodiments thereof. However, it will be appreciated by those skilled in the art that changes may be made in these embodiments without departing from the principles and spirit of the invention, the scope of which is defined in the appended claims and their equivalents.

What is claimed is:

1. A method for activating a fuel cell stack, the method comprising:
   humidifying, a high humidity open circuit voltage operation, the fuel cell stack and operating the fuel cell stack at an open circuit voltage; and
   wetting, a vacuum wetting operation, pores of a polymer electrolyte membrane by cutting off a supply of hydrogen and air and applying a current to consume residual gas in the fuel cell stack,
   wherein the high humidity open circuit voltage operation and the vacuum wetting operation are performed alternately and repeatedly.

2. The method of claim 1, wherein the high humidity open circuit voltage operation and the vacuum wetting operation are performed repeatedly at regular intervals.

3. The method of claim 2, wherein the high humidity open circuit voltage operation is performed repeatedly for a predetermined time of 2 to 5 minutes.

4. The method of claim 3, wherein the vacuum wetting operation is performed repeatedly for a predetermined time of 2 to 5 minutes.

5. The method of claim 1, wherein in the high humidity open circuit voltage operation, humidification is performed at a relative humidity of 100%.

6. The method of claim 1, further comprising a hermetic storage operation performed after the high humidity open circuit voltage operation and the vacuum wetting operation are performed repeatedly.

* * * * *